(12) United States Patent
Eisele et al.

(10) Patent No.: US 9,348,018 B2
(45) Date of Patent: May 24, 2016

(54) MEASUREMENT DEVICE FOR MEASURING A DISTANCE BETWEEN THE MEASUREMENT DEVICE AND A TARGET OBJECT USING AN OPTICAL MEASUREMENT BEAM

(75) Inventors: Andreas Eisele, Leinfelden-Echterdingen (DE); Bernd Schmidtke, Leonberg (DE); Reiner Schnitzer, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/005,392

(22) PCT Filed: Jan. 25, 2012

(86) PCT No.: PCT/EP2012/051085
§ 371 (c)(1),
(2), (4) Date: Nov. 25, 2013

(87) PCT Pub. No.: WO2012/123152
PCT Pub. Date: Sep. 20, 2012

(65) Prior Publication Data
US 2014/0071433 A1   Mar. 13, 2014

(30) Foreign Application Priority Data

Mar. 17, 2011   (DE) .................. 10 2011 005 740

(51) Int. Cl.
*G01S 7/481*   (2006.01)
*G01S 7/486*   (2006.01)
*G01S 17/08*   (2006.01)

(52) U.S. Cl.
CPC .............. *G01S 7/481* (2013.01); *G01S 7/4816* (2013.01); *G01S 7/4863* (2013.01); *G01S 17/08* (2013.01)

(58) Field of Classification Search
CPC ....................................... G01S 7/481
USPC ............. 356/3.01–3.15, 4.01–4.1, 5.01–5.15, 356/6–22, 28, 28.5
See application file for complete search history.

(56) References Cited

U.S. PATENT DOCUMENTS

| 7,301,608 | B1 | 11/2007 | Mendenhall et al. |
| 2006/0228050 | A1 | 10/2006 | Xu et al. |
| 2007/0076189 | A1* | 4/2007 | Kumagai et al. ............. 356/5.01 |
| 2009/0009747 | A1 | 1/2009 | Wolf et al. |
| 2009/0185159 | A1* | 7/2009 | Rohner et al. ............... 356/5.01 |
| 2010/0045966 | A1* | 2/2010 | Cauquy et al. ............... 356/5.11 |

FOREIGN PATENT DOCUMENTS

| CN | 1940595 A | 4/2007 |
| DE | 44 39 298 A1 | 6/1996 |

(Continued)

OTHER PUBLICATIONS

International Search Report corresponding to PCT Application No. PCT/EP2012/051085, mailed Apr. 25, 2012 (German and English language document) (7 pages).

*Primary Examiner* — Luke Ratcliffe
(74) *Attorney, Agent, or Firm* — Maginot, Moore & Beck LLP

(57) ABSTRACT

The disclosure relates to a measurement device for optically measuring a distance to a target object, in particular a handheld measurement device. The disclosure relates to such a measurement device having a transmitting device for transmitting an optical measurement beam to a target object; a receiving device having a detection surface for detecting the optical measurement beam returning from the target object, wherein the detection surface has a plurality of pixels, and each pixel has at least one light-sensitive element; and a reference device having a detection surface for detecting a device-internal reference beam. According to the disclosure, the detection surface of the reference device has a plurality of pixels, wherein each pixel has at least one light-sensitive element.

17 Claims, 6 Drawing Sheets

FOREIGN PATENT DOCUMENTS

| | | |
|---|---|---|
| DE | 198 04 050 A1 | 8/1999 |
| DE | 10 2006 013 290 A1 | 9/2007 |
| EP | 1 903 299 A1 | 3/2008 |
| EP | 2 017 651 A2 | 1/2009 |
| EP | 2 264 481 A1 | 12/2010 |
| WO | 2004/055544 A1 | 7/2004 |

* cited by examiner

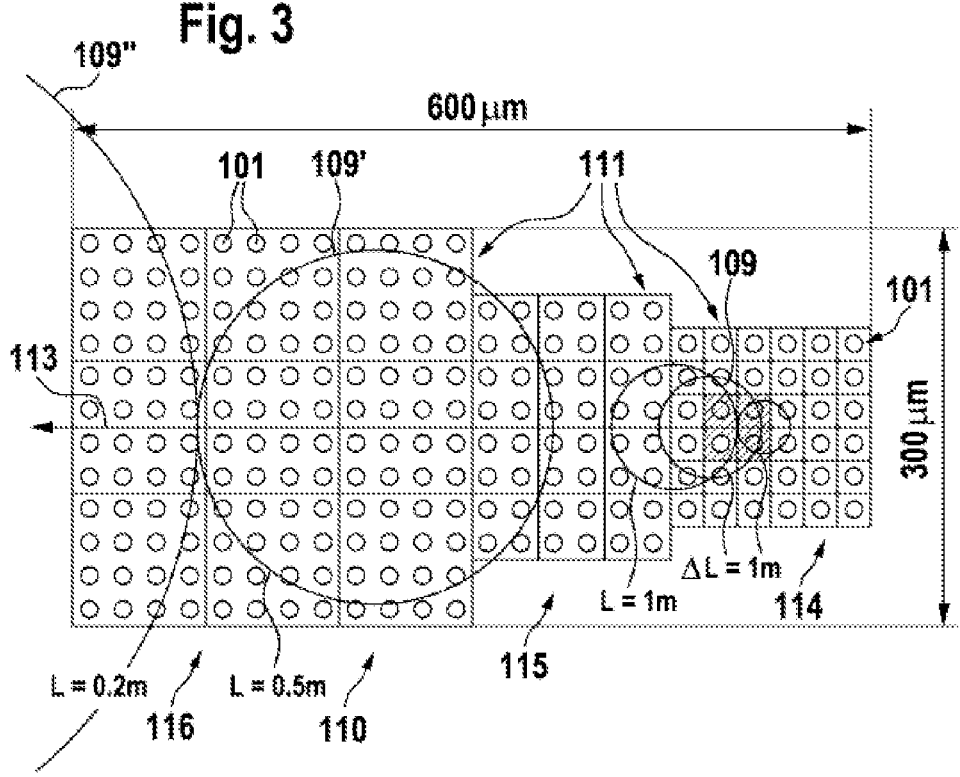
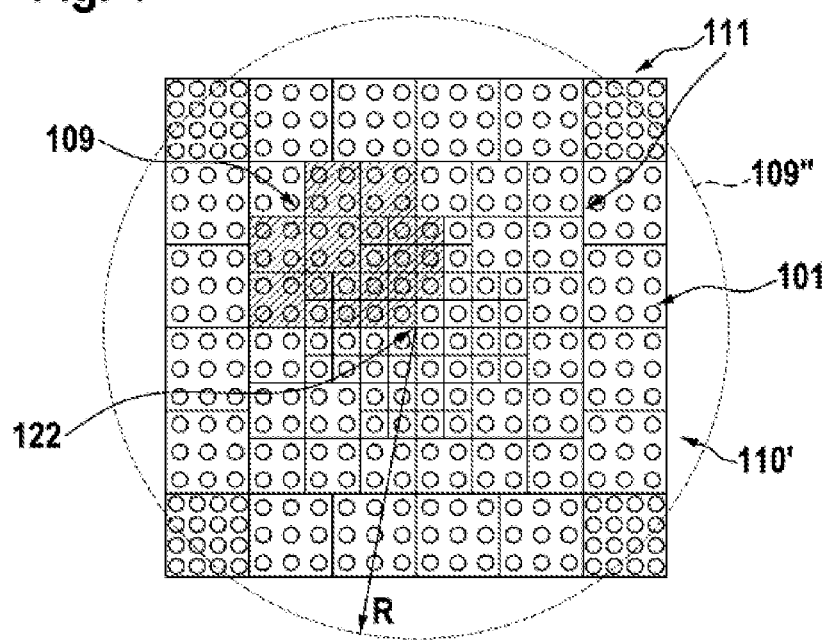

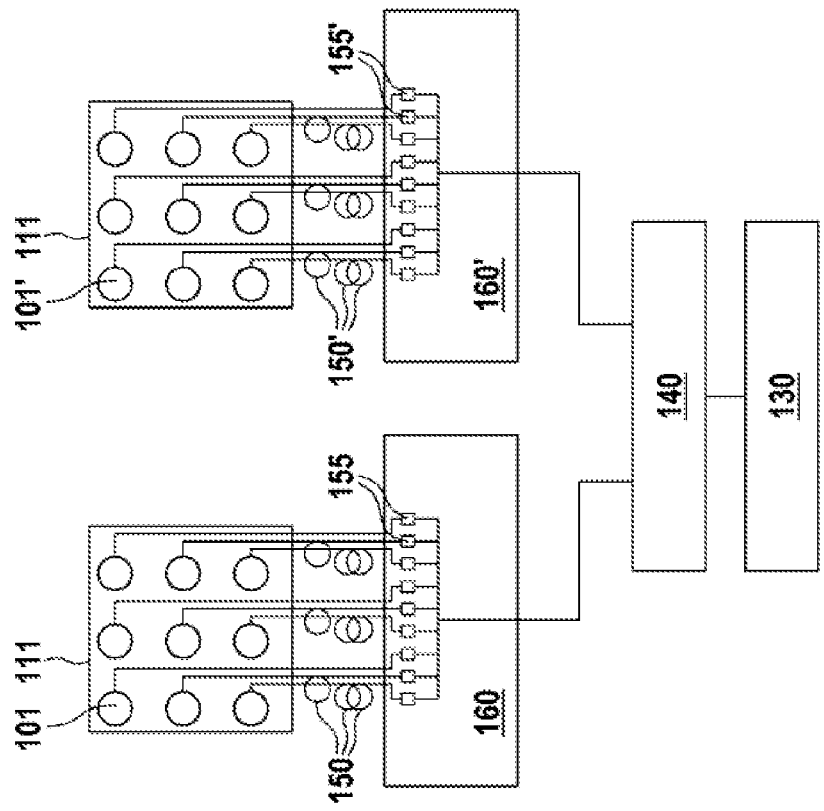
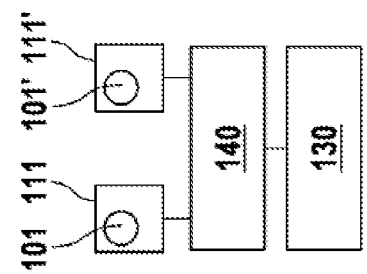
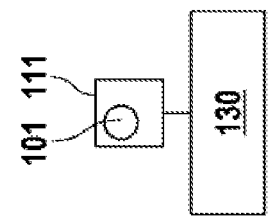

MEASUREMENT DEVICE FOR MEASURING
A DISTANCE BETWEEN THE
MEASUREMENT DEVICE AND A TARGET
OBJECT USING AN OPTICAL
MEASUREMENT BEAM

This application is a 35 U.S.C. §371 National Stage Application of PCT/EP2012/051085, filed on Jan. 25, 2012, which claims the benefit of priority to Serial No. DE 10 2011 005 740.4, filed on Mar. 17, 2011 in Germany, the disclosures of which are incorporated herein by reference in their entirety.

The disclosure relates to a measuring device for measuring a distance between the measuring device and a target object with the aid of optical measurement radiation.

BACKGROUND

Optical ranging instruments are known, which direct a time-modulated light beam in the direction toward a target object, the distance of which from the measuring instrument should be established. The returning light, reflected or scattered by the targeted target object, is at least partly detected by the instrument and used to establish the distance to be measured. Here, a typical measurement range lies in a range of distances from a few centimeters to several 100 meters.

In order to be able to measure the distance to the target object using a light beam, the light beam is e.g. modulated in time in terms of its intensity. By way of example, light pulses can be emitted and a run-time of a light pulse from the emission to the detection can be measured and the distance to the target object can be calculated therefrom. However, very short light pulses have to be emitted for this purpose and very fast detection electronics have to be used in order to be able to obtain sufficiently accurate measurement results. Alternatively, the intensity of a light beam can be modulated periodically in time and a phase shift between the emitted and the detected light signal can be used to determine the run-time and hence the distance to the target object. The principle of laser distance measurement is generally known by the phrase "time-of-flight ranging", for example with continuous modulation of the intensity of the laser beam.

DE 198 04 050 A1 has disclosed a ranging instrument with a laser diode and photodiode for generating and receiving an optical transmission or reception measurement signal. In order to carry out a calibration of the ranging instrument, the latter is provided with an adjustable reflecting flap which, during the calibration, is adjusted by an actuation drive in an optical path of the transmission measurement signal, as a result of which the transmission measurement signal is deflected and directly directed onto the photodiode via a reference path.

DE 10 2006 013 290 A1 discloses a device for optical ranging, in which a detector of a reception unit has a plurality of light-sensitive areas, which are separated from one another and can be activated separately from one another. Here, each of the light-sensitive areas has a photodiode, e.g. a PIN diode or an APD (avalanche photodiode), or a CCD chip as light-sensitive element. These light-sensitive elements establish an analog detection signal corresponding to an intensity of the received light. The light-sensitive areas can be activated in a selective manner and can in this fashion be combined to form an overall detection area, which can be adapted to the best possible extent to a portion of the detector area illuminated by a light source in order thus to improve a signal-to-noise ratio.

SUMMARY

There may be a need for a measuring device for optical ranging which, particularly when compared to the above-described conventional ranging instruments, allows improved calibration of the measuring device in order thus to compensate for run-time errors and run-time drifts.

Furthermore, there may be a need for a ranging device which, particularly when compared to the above-described conventional ranging instruments, the realization of a reference unit which is as compact as possible in order to measure the device-internal reference path for calibrating the measuring device.

The measuring device according to the disclosure for optical ranging comprises a transmission apparatus for emitting optical measurement radiation toward a target object; a reception apparatus with a detection area for detecting optical measurement radiation returning from the target object, wherein the detection area has a multiplicity of pixels, wherein each pixel has at least one light-sensitive element. Furthermore, the measuring device according to the disclosure for optical ranging comprises a reference apparatus with a detection area for detecting device-internal reference radiation. According to the disclosure, the detection area of the reference apparatus consists of a multiplicity of pixels, wherein each of these pixels has at least one light-sensitive element.

Within the scope of this application, the term pixel is used synonymously for the "detector", the "detection element" or even the "light-sensitive element" itself if a pixel only has a single detector or light-sensitive element. If several detectors or light-sensitive elements are evaluated together, this plurality likewise forms a pixel within the meaning of this application. This is what is to be understood by the phrase "wherein each pixel has at least one light-sensitive element", which is occasionally used in the application.

In an advantageous embodiment, such a light-sensitive element is formed by a SPAD ("single photon avalanche diode").

A SPAD is a light-sensitive element which supplies a digital detection signal depending on an impinging light intensity. Here, each of the pixels can be connected directly to the evaluation apparatus or, for example, a multiplexer, which is designed to conduct detection signals from several pixels selectively, can be connected therebetween. By way of example, what this can achieve is that detection signals from individual pixels or a group of pixels can be evaluated by the evaluation apparatus independently of detection signals from other pixels.

A SPAD can have the property that, unlike conventional light-sensitive elements with analog operation, it does not supply a detection signal which is linearly dependent on the impinging radiation but rather generates an individual signal in the case of each impinging photon. After a photon impinges thereon, the SPAD cannot be activated again for a certain dead time, which can lie in the range of, for example, 1 to 100 ns. This is also referred to as a paralyzable response characteristic. The count rate with which a SPAD can count impinging photons therefore has an upper limit as a result of the dead time. It may therefore be advantageous to provide several smaller SPADs within one pixel instead of a single large-area SPAD and, for example, combine detection signals from SPADs contained in a single pixel with the aid of a combiner. By way of example, the combiner can in this case be embodied in the form of an OR gate or in the form of a bus. This allows the maximum photon count rate that can be achieved by the pixel to be increased or, expressed differently, the dead time of the pixel between individual detection events to be reduced. Furthermore, a pulse shortener can be arranged between a SPAD and a combiner or bus in order to shorten a digital signal generated by the SPAD in time and thereby enable a shortened overall dead time and an increased photon count rate of the system.

The number of SPADs or the area of SPADs contained in a pixel can be variably selected, depending on the location of the pixel within the detection area of the reception apparatus. By way of example, it may be known that the measurement radiation returning from the target object can impinge upon the detection area of the reception apparatus at a different position and/or with a different cross-sectional area, depending on the distance of the target object from the measuring device. The number of SPADs or the area of the SPADs within a pixel can accordingly be adapted to the expected impinging light intensity, depending upon position. By adapting the areas of the SPADs and/or the number of SPADs within a pixel, it is possible to optimize a dynamic range of the measuring device. By adapting the pixel areas to a laser spot size, it is possible to optimize a signal-to-noise ratio.

However, alternatively, the light-sensitive elements can also be formed by modulated CCDs, CMOS pixels or APDs or PIN diodes.

The transmission apparatus can be a light source, for example in the form of an LED, a laser or a laser diode, which emits light toward the target object in a time-modulated fashion. Here, the time modulation can be continuous and/or periodic, e.g. sinusoidal. It is also possible to emit pulse trains, e.g. non-periodic pulse trains such as e.g. in the form of so-called pseudo-noise pulse sequences.

The transmission apparatus and the reception apparatus are preferably designed and adapted to one another in such a way that optical measurement radiation returning from the target object illuminates a plurality of pixels or detectors simultaneously under normal measurement conditions, i.e., for example, in the case of measurement distances of a few centimeters up to several 100 meters. However, the fact that a plurality of pixels are illuminated simultaneously should not be used here, unlike in conventional 3D-cameras, to detect an image of the target object or a spatial resolution in respect of the distance to individual portions on a surface of the target object but should, as will be explained in more detail below, inter alia enable advantages in respect of a detection sensitivity and/or an adjustment tolerance. The distance between the measuring device and the target object is in this case established on the basis of an evaluation of detection signals from several pixels, in particular several of the pixels illuminated simultaneously.

To this end, the transmission apparatus can emit a measurement beam, the cross-section of which is sufficiently large for the portion of the measurement beam returning from the target object always to illuminate a plurality of pixels. In order to focus the measurement radiation returning from the target object and guide it onto the detection area, in order thereby to ensure a sufficiently strong detection signal, provision can be made within an optical path from the transmission apparatus to the reception apparatus for a simple optical unit, for example in the form of one or more lenses. This simple optical unit can, in a cost-saving and complexity-reducing manner, be embodied as a non-automatically focusing optical unit ("fixed focus"). Since such a non-automatically focusing optical unit with a fixed focal length is only able to focus a measurement beam returning from the target object onto the detection area of the reception apparatus in an optimum manner, i.e. with the smallest spot diameter, when the target object is situated at the object distance from the measuring device corresponding to the focal length and image plane, the number of pixels which are illuminated simultaneously by measurement radiation returning from the target object can vary, depending on a distance between the target object and the measurement object. By way of example, the optimization of the optical reception system for receiving measurement radiation from target objects that are far away with a large object distance can mean that focal length and image distance are to be selected in such a way that the geometric imaging condition is achieved for the large object distance. Hence, in the case of a large distance, it is possible to achieve the smallest spot diameter in the image plane ("the image is in focus"). By setting the focal length and image plane, the number of pixels which are illuminated in the case of a target object being situated more closely can be significantly larger than in the case of a target object situated far away. In the case of a target object situated more closely, the returning measurement radiation can no longer be imaged in focus, and so the illuminated region of the detection area can be correspondingly larger.

The reference unit also has a detection area for detecting device-internal reference radiation, wherein the detection area of the reference apparatus consists of a multiplicity of pixels, wherein each of these pixels has at least one light-sensitive element. Instead of one reference detector, several reference detectors are utilized according to the disclosure.

One pixel of the detection area of the reference apparatus is advantageously assigned to each pixel of the detection area of the reception apparatus. An appropriate reference detector is selected for each detector of the target reception apparatus, which reference detector for example has similar run-time errors, for example run-time drift over temperature.

The pixels of the detection area of the reception apparatus advantageously form a reception array and the pixels of the detection area of the reference apparatus form a reference array.

In a particularly advantageous embodiment, the reception array and the reference array have the same design, and so two identical arrays are utilized. Here, the term array relates to the geometric arrangement of the pixels or detector elements on the detection area. In this embodiment, the array elements of reception array and reference array which correspond in terms of their position can be assigned to one another.

The individual pixels (detectors) of a detector array can, depending on their position in the array, have different line lengths and hence different capacitances until the signals of the pixels leave the array and are able to be evaluated. External influences, such as e.g. temperature, or self-heating during operation can vary the edge steepness of the components. Even small changes in the edge steepnesses, which typically lie in the range of several 10 ps/V, could thus cause distance errors in the mm-range.

The present disclosure solves this run-time problem between target detector and reference detector by virtue of the fact that a reference detector with a similar run-time drift is used for each target detector. The run-time error of the target detector to a general reference detector is thereby reduced to a run-time drift difference between target detector and associated reference detector.

Instead of a static run-time offset, which could for example be stored in a lookup table, the solution according to the disclosure also reduces run-time drifts (e.g. over temperature).

In particular, this is also achieved by a symmetric design of the system.

However, alternatively, the use of unequal array arrangements of reception array and the reference array is also possible.

A particularly advantageous and compact design emerges if two—in particular identical—arrays are implemented on a chip, wherein one is then utilized for target measurement and one is utilized for reference measurement.

Every pixel of the detection area of reception unit and/or reference unit can be connected to an evaluation device directly or, for example, with the interposition of a multiplexer designed to transmit detection signals from several pixels selectively. What this can achieve, for example, is that detection signals of individual pixels or a group of pixels can be evaluated by the evaluation apparatus, independently of detection signals of other pixels.

Since the detection signals of individual pixels can be evaluated independently of one another, the reception apparatus and the evaluation apparatus can be designed to establish a distance between the measuring device and the target object on the basis of an evaluation of detection signals only of pixels onto which light of the area of the target object illuminated by the transmission apparatus is radiated back. In other words, the evaluation apparatus can for example initially establish in a preliminary measurement which pixels of the detection area in actual fact receive measurement radiation of the transmission apparatus and which pixels merely detect background radiation and can subsequently merely use the detection signals of the pixels illuminated by the measurement radiation for the actual distance determination. As a result of this, a signal-to-noise ratio can be substantially increased.

In order to be able to establish the distance between the measuring device and the target object, the evaluation apparatus can have a plurality of distance determination apparatuses (in part also known as "binning scheme"). A distance determination apparatus can be designed to establish data which correlate to the distance to be determined between the measuring device and the target object and which can therefore ultimately be used to establish the desired distance. By way of example, it is possible to establish a flight time of measurement radiation between an emission by the transmission apparatus and a detection on the detection area of the measurement radiation returning from the target object and determine the desired distance therefrom. To this end, the distance determination apparatus can compare information, provided by the transmission apparatus, relating to the time modulation of emitted measurement radiation with detection signals provided by the reception apparatus. By way of example, in the case of emitted measurement radiation with periodic modulation, a corresponding distance can be established from a phase difference between an emission signal and a detection signal.

In principle, a single distance determination apparatus can suffice for establishing a distance between the measuring device and the target object. In order to keep the number of distance determination apparatuses small, it may be advantageous to guide the detection signals from individual pixels or a group of pixels to a distance determination apparatus in succession, for example with the aid of a multiplexer. As a result of such a sequential processing of detection signals, there may be an increase in the overall measurement duration. Alternatively, each pixel can be assigned its own distance determination apparatus. In this case respectively one distance can be determined from each of the detection signals from the multiplicity of pixels, possibly parallel in time with respect to one another, and a distance, ultimately to be determined, between the device and the target object can finally be established, for example by averaging, from the multiplicity of determined distances. However, to this end, it may be necessary to provide a very large number of distance determination apparatuses in the measuring device, which may render the design and the production of the measuring device complicated.

As a compromise between these two extreme alternatives, as it were, a plurality of pixels can be connected to one distance determination apparatus and the distance determination apparatus can be designed to determine the distance-correlated data on the basis of detection signals from the plurality of pixels. Thus, the evaluation apparatus proposed here has a plurality of distance determination apparatuses and can be designed to determine the distance between the measuring device and the target object on the basis of the distance-correlated data determined by the distance determination apparatuses, for example by forming an average.

By employing a plurality of distance determination apparatuses, the time required for finding the pixels receiving measurement radiation can be reduced since skillful selection of selection algorithms allows variable combinations of pixels to be evaluated in parallel.

The number of light-sensitive elements or the area of the individual light-sensitive elements contained in a pixel can be selected variably depending on the location of the pixel within the detection area of the reception apparatus and/or reference unit. By way of example, it may be known that the measurement radiation returning from the target object can impinge at a different position and/or with a different cross-sectional area on the detection area of the reception apparatus depending on the distance of the target object from the measuring device. The number or the area of light-sensitive elements within a pixel can accordingly be adapted in a spatially dependent manner to the expected impinging light intensity. It is possible to optimize a dynamic range of the measuring device by adapting the areas and/or number of light-sensitive elements within a pixel. A signal-to-noise ratio can be optimized by adapting the pixel areas to a laser spot size.

By way of example, if a non-automatically focusing optical unit, which is designed to image or focus in an optimum fashion target objects that are far away, is arranged in the light path between the transmission apparatus and the reception apparatus, the returning measurement radiation for target objects that are far away can be focused with a small spot diameter. Within such a region of the detection area, it may be advantageous for each pixel to contain merely a single light-sensitive element or only a few light-sensitive elements. If more closely situated target objects are targeted by means of such a fixed focus measuring device, the returning measurement radiation cannot be focused as a small spot on the detection area but rather impinges, possibly defocused, on a relatively large portion of the detection area. Overall, more pixels are then illuminated in this case than in the case of a target object situated far away. It may therefore be advantageous to combine a plurality of light-sensitive elements to form a single pixel (or "sub-array" or "cluster") in each case in edge regions of the illuminated portion of the detection area.

By way of example, the transmission apparatus and the reception apparatus can be arranged next to one another along a parallax axis. Such so-called biaxial measuring systems can be advantageous in that there is no need for complicated radiation splitting for selecting the returning measurement beam. The measurement beam emitted by the transmission apparatus and returning from the target object can in this case impinge upon the detection area at a different point along the parallax axis and can have different cross-sections, depending on the distance of the target object. In this case, it may be advantageous to vary the number of light-sensitive elements contained in a pixel depending on the location of the pixel along the parallax axis. In particular, it may be advantageous to select the number of light-sensitive elements contained in a pixel to be smaller in pixels close to the transmission apparatus than in pixels far away from the transmission apparatus.

Alternatively, the transmission apparatus and the reception apparatus can be arranged coaxially with respect to one another. What can be achieved in the case of such a monoaxial measuring device, for example with the aid of semitransparent mirrors, is that the center of the region of the detection area illuminated by the returning radiation remains largely constant in space, independent of the distance of the target object. However, the cross section of the illuminated region on the detection area can continue to depend on the distance of the target object. In the case of target objects that are far away and an optical unit with a long focal length, there may be a small illuminated spot and, in the case of more closely situated target objects, there may be a larger illuminated spot. It may be advantageous to select the number of light-sensitive elements contained in a pixel to be smaller in pixels close to the center of the detection area than in pixels at a distance from the center of the detection area.

Possible aspects, advantages and embodiments of the disclosure were described above with reference to individual embodiments of the disclosure. The description, the associated figures and the claims contain several features in combination. A person skilled in the art will also consider these features individually, in particular also the features of different exemplary embodiments, and combine these to form expedient further combinations.

BRIEF DESCRIPTION OF THE DRAWINGS

In the following text, embodiments of the disclosure and partial aspects contained therein are described with reference to the attached figures. The figures are merely schematic and not drawn to scale. The same or similar reference signs in the figures denote the same or similar elements.

FIG. 3 shows a top view of a detection area of a reception apparatus for a measuring device in accordance with one embodiment of the present disclosure.

FIG. 4 shows a top view of an alternative detection area of a reception apparatus for a measuring device in accordance with one embodiment of the present disclosure.

FIG. 5 shows an individual light-sensitive element, which is connected to a distance determination apparatus.

FIG. 6 shows two light-sensitive elements which are connected to a distance determination apparatus via a multiplexer.

FIG. 7 shows two pixels with in each case 9 light-sensitive elements, which are connected to a distance determination apparatus via combiners and multiplexers.

DETAILED DESCRIPTION

Figure 1:
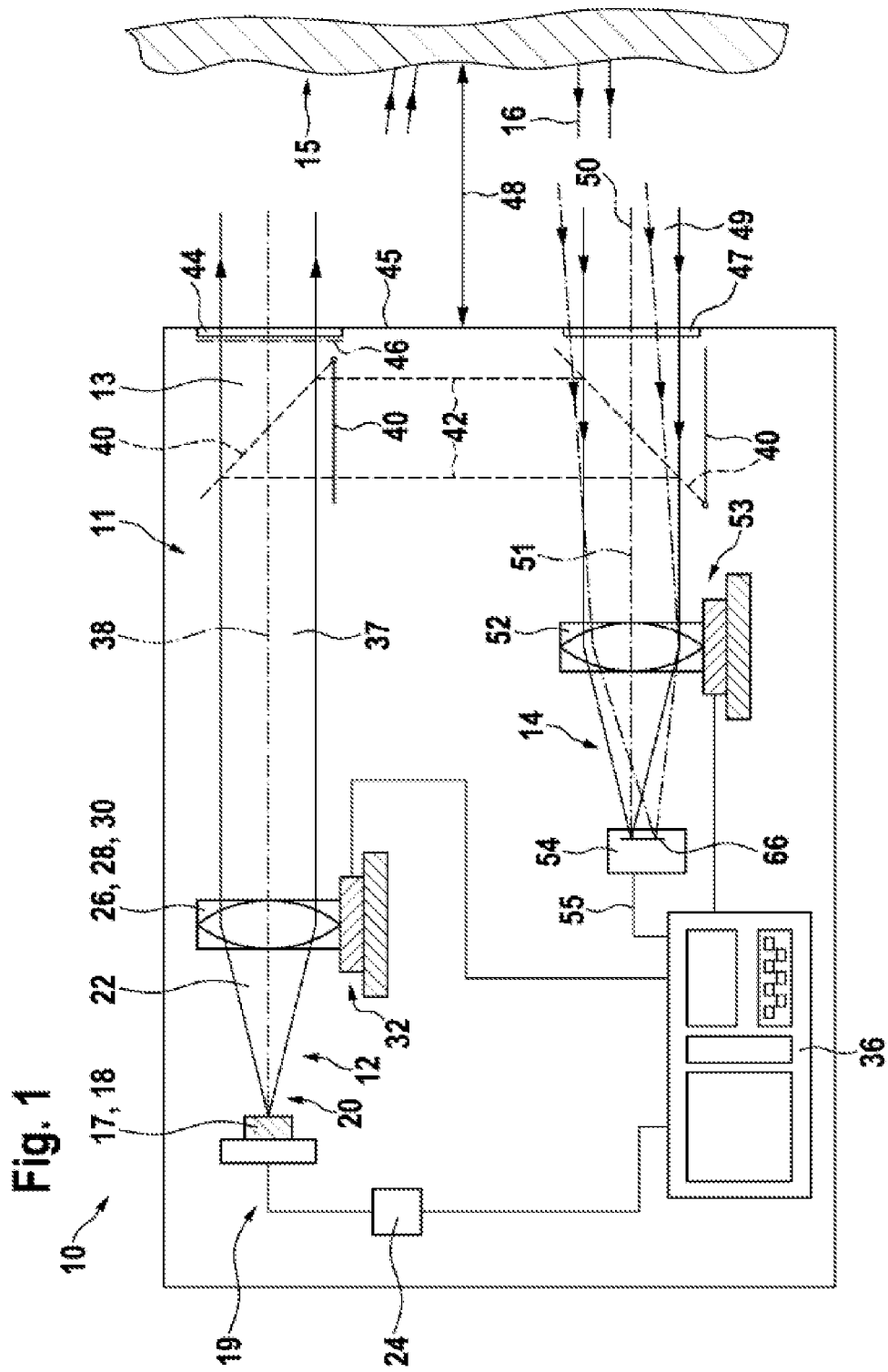
FIG. 1 shows a measuring device for optical ranging in accordance with one embodiment of the present disclosure.

FIG. 1 schematically illustrates a measuring device 10 according to the disclosure for optical ranging, with the most important components for describing the function thereof.

The measuring device 10 has a housing 11, in which a transmission apparatus 12 for emitting optical measurement radiation 13 and a reception apparatus 14 for detecting measurement radiation 16 returning from a target object 15 are arranged.

The transmission apparatus 12 contains a light source which is realized by a semiconductor laser diode 18 in the illustrated exemplary embodiment. The laser diode 18 emits a laser beam 20 in the form of a light bundle 22 visible to the human eye. To this end, the laser diode 18 is operated by a control instrument 24 which generates a time modulation of an electric input signal 19 of the laser diode 18 by appropriate electronics. What this type of modulation of the diode current can achieve is that the optical measurement radiation 13, which is utilized for ranging, is likewise modulated in its intensity over time in the desired fashion.

The laser beam bundle 20 subsequently passes through a collimation optical unit 26 in the form of an objective 28, which is illustrated in a simplified fashion in the form of an individual lens in FIG. 1. In this exemplary embodiment, the objective 28 is optionally situated on an adjustment setup 32, which in principle enables a change in the position of the objective in all three spatial directions, for example for adjustment purposes. However, alternatively, the collimation optical unit 26 can also already be a component of the laser diode 18 or be fixedly connected to the latter.

After passing through the objective 28, this results in an e.g. amplitude-modulated signal of the measurement radiation 13 in the form of a virtually parallel light bundle 37 which propagates along an optical axis 38 of the transmission unit 12.

Moreover, there can also be a preferably switchable beam deflection 40 in the transmission apparatus 12, which beam deflection allows the deflection of the measurement radiation 13 directly, i.e. instrument-internally, onto the measuring apparatus 54 while completely or partly bypassing the target object 15. This allows the generation of an instrument-internal reference path 42, which allows a calibration or adjustment of the measuring device. In this case, the measuring signal serves as reference radiation.

If a distance measurement is carried out by means of the measuring device 10, the measurement radiation 13 leaves the housing 11 of the measuring device through an optical window 44 in the end wall 45 of the measuring device 10. The opening of the optical window 44 can for example be protected by a shutter 46. For the actual measurement, the measuring device 10 is then aligned onto a target object 15, the distance 48 of which to the measuring device 10 is to be established. The signal 16 reflected or scattered on the desired target object 15 forms returning optical measurement radiation 16 in the form of a returning beam bundle 49 or 50, which, to a certain extent, passes back into the measuring device 10.

The returning measurement radiation 16 is coupled into the measuring device 10 through an entry window 47 on the end face 45 of the measuring device 10 and then impinges on a reception optical unit 52, as illustrated in FIG. 1.

Two returning measurement beam bundles 49 and 50 for two different target object distances 48 are plotted for clarification purposes in FIG. 1 in an exemplary fashion. For large object distances, wherein large can be interpreted as being large compared to the focal length of the reception optical unit 52, the optical measurement radiation 16 returning from the target object 15 impinges approximately parallel to the optical axis 51 of the reception apparatus 14. In the exemplary embodiment of FIG. 1, this case is represented by the measurement beam bundle 49. As the object distance becomes smaller, the returning measurement radiation 16 impinging into the measuring device becomes ever more inclined compared to the optical axis 51 of the reception apparatus 14 due to a parallax. In FIG. 1, the beam bundle 50 is plotted as an example for such a returning measurement beam bundle in the near range of the measuring device.

The reception optical unit 52, which is likewise only symbolized schematically in FIG. 1 by an individual lens, focuses the beam bundle of the returning measurement radiation 16 onto the detection area 66 of a reception detector provided in the measuring apparatus 54. The detector has a multiplicity of pixels in order to detect the optical measurement radiation. Every one of the pixels has at least one light-sensitive element. The impinging returning measurement radiation 16 is converted into an electric signal 55 by the light-sensitive elements provided on the detection area 66, which light-sensitive elements are arranged in a matrix-like fashion in pixels, either individually or combined in groups, and connected to an evaluation apparatus 36, and said electric signal is supplied to the further evaluation in the evaluation apparatus 36.

The measuring apparatus 54 is moreover also a component of a reference unit 137. To this end, the measuring unit 54 also has a detection area 117 for detecting a reference signal which can be routed to the measuring apparatus 54 and the detection area 117 of the reference detector over an instrument-internal reference path 42. The detector of the reference unit has a multiplicity of pixels 127 for detecting the optical measurement radiation sent over the reference path 42. Every one of the pixels 127 has at least one light-sensitive element 107. (In this respect, see in particular FIGS. 8 to 10). The impinging reference radiation is converted to an electric signal by the light-sensitive elements 107 provided in the detection area 127, which light-sensitive elements are arranged in a matrix-like fashion in pixels 127, either individually or combined in groups, and connected to an evaluation apparatus 36, and said electric signal is supplied to the further evaluation in the evaluation apparatus 36.

The detection signals generated by an individual light-sensitive element or a combination of light-sensitive elements can be fed to the distance determination apparatuses contained in an evaluation apparatus 36.

A distance determination apparatus can sum the detection signals and generate a signal therefrom, which signal corresponds to a time-dependent intensity of the light signal impinging on the respective light-sensitive elements or to the light intensity. By putting this signal in relation with an excitation signal which specifies the time profile of the photon rate emitted by the transmission apparatus, it is possible to deduce a photon flight time from the transmission apparatus to the target object and back to the reception apparatus. If the transmission apparatus periodically modulates the emitted light, for example in a sinusoidal fashion, a flight time can be established from a phase difference between the emitted and the detected measurement radiation.

Figure 2:
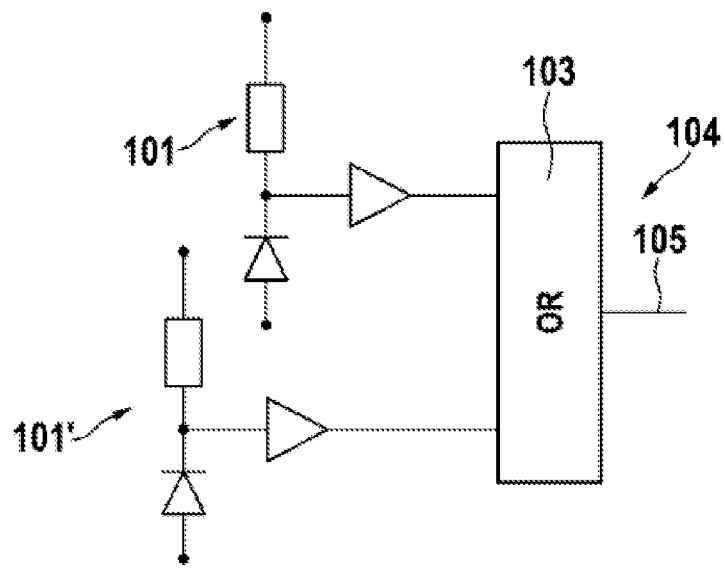
FIG. 2 shows a schematic electric network of two light-sensitive elements, which are connected to a combiner, for a measuring device in accordance with one embodiment of the present disclosure.

FIG. 2 shows two light-sensitive elements 101, 101', the detection signals of which are respectively transmitted to an OR gate 103. The OR gate 103 serves as a combiner 104 by virtue of receiving both detection signals from the first light-sensitive element 101 and detection signals from the second light-sensitive element 101' and emitting a combined signal of these input signals at an output 105. The light-sensitive elements of the reference detector also have an analogous design. The functionality described below for the reception unit and the design for measuring distance measurement value also applies analogously to the reference unit of the measuring device.

In the following text, the measurement method is firstly illustrated in detail on the basis of the reception unit in order thereby to clarify the design and the functionality of the reference unit according to the disclosure and the interaction thereof with the reception unit.

FIG. 3 schematically shows a detection area 110 of the reception unit for a laser ranging device with uncorrected parallax. Here, circular laser spots 109, the diameter of which varies dependent on a distances L between the measuring device and the target object, are plotted on the detection area 110. In this case, an ideal lens with a focal length f=30 mm, a diameter d=4 mm and a parallax of 5 mm was assumed for the case of optimum adjustment to large distances. Here, the laser radiation was assumed to have divergence of 1 mrad. In this embodiment of the detection area 110, it is advantageous that the size of the pixels 111 or the number of light-sensitive elements 101 within the respective pixels 111 increases along the parallax axis 113. The detection area 110 is a component of the measuring apparatus 54. Here, the parallax axis is assumed to be the straight line of an intersection between a detection area plane and a plane spanned by the optical axis of the reception optical unit and the laser beam axis of the ranging device. What can be identified is that small pixels are provided in a first region 114, onto which the laser spot 109 impinges if the laser beam is returned from a target object that is far away, which small pixels each contain only a single light-sensitive element. Larger pixels with in each case four light-sensitive elements are provided in a region 115 onto which the laser spot 109' impinges if the target object is at a distance of approximately 0.5 to 1 m. Particularly large pixels with 8 or 16 light-sensitive elements are provided in a further region 116, onto which the laser spot 109" impinges in the case of very close target objects. Here, the reception optical unit is optimized in such a way that the best possible imaging quality, i.e. the smallest possible laser spot diameter on the detection area, is achieved at the largest distance of the target object.

As a result of the in-focus imaging, the laser spot 109 is comparatively small at large distances. At the same time, the intensity of the impinging light, composed of returning measurement radiation and background radiation, is comparatively low as a result of the small component of the measurement radiation from the target object that is far away. In the case of target objects positioned more closely, more measurement radiation overall is reflected or scattered back to the detection area 110 from the target object. At the same time, the measurement radiation is no longer imaged in focus on the detection area 110 by the fixed focus reception optical unit.

Overall, a geometric consideration for a laser ranging instrument with a slightly divergent laser beam and a fixed focus reception optical unit results in a light intensity, in the detector plane, for the component of the received laser radiation which drops off quadratically with distance in the case of large distances and which is constant over the distance in the case of small distances. By contrast, to a first approximation, the intensity component of the background radiation is independent of distance.

Firstly, what can be achieved with a spatially dependent design of the size of the pixels 101 contained in the detection area 110, as illustrated in FIG. 3, is that a laser spot 109 respectively impinges on a plurality of pixels 111, both in the case of large distances of the target object and in the case of small distances of the target object, and can be evaluated by said pixels. Here, the size of the active detection area can be optimally adapted to the size of the laser spot and hence it is possible to optimize the signal-to-noise ratio. Secondly, using such a spatially dependent design, it is also possible to use the dynamic range of the light-sensitive elements in an optimum fashion since the light intensity of the impinging light (laser portion and background portion) is lower at large distances than at small distances. It is therefore possible to reduce the area of the individual light-sensitive elements in the case of those detector areas which are only impinged by received measurement radiation in the case of small distances. In detector regions in which the intensity of the received measurement radiation remains virtually constant, the number of light-sensitive elements 101 contained in the individual pixels 111 can be increased in the case of unchanging area of the light-sensitive elements.

FIG. 4 shows an embodiment of a detection area 110' for a coaxial laser ranging instrument or a laser ranging instrument with corrected parallax. Such a correction can be achieved with the aid of a near-range element or alternative, known methods. In such a case, the aberration resulting from the finite depth-of-field of the reception optical unit substantially dominates such that a concentric arrangement of the pixels of the same size is advantageous. A laser beam returning from a target object that is far away is focused well and generates a relatively small laser spot 109 in the vicinity of the center 122 of the detection area 110', i.e. in the vicinity of the penetration point of the optical axis of the reception optical unit through the detection area plane. A laser beam returning from a more closely situated target object generates a laser spot 109" with a substantially larger diameter. The pixels 111 have a smaller area in the vicinity of the center 122 and a smaller number of light-sensitive elements 101 contained therein than at a distance from the center 122 of the detection area 110', i.e. at the edge of the detection area.

In FIGS. 5 to 7, individual elements, as utilized to realize a reception apparatus in accordance with embodiments of the present disclosure, are illustrated in a block diagram. Analogous embodiments also apply to the individual elements of the reference apparatus.

FIG. 5 shows a pixel 111 with a single light-sensitive element 101. The pixel is connected to a distance determination apparatus 130.

FIG. 6 shows two pixels 111, 111', each with one light-sensitive element 101, 101'. The pixels 111, 111' are connected to a multiplexer 140, which selectively transmits the detection signals supplied by the pixels 111, 111' to a distance determination apparatus 130.

FIG. 7 illustrates an arrangement of two pixels 111, 111' with in each case nine light-sensitive elements 101, 101'. The detection signals from the individual light-sensitive elements 101, 101' are, optionally after a time delay caused by additional retardation elements 150, 150', in each case transmitted to a combiner 160, 160'. The retardation can serve the compensation of run-time differences and hence the time synchronization of the light-sensitive elements of a pixel or different pixels. The detection signals are combined with one another in the combiners 160, 160'. The combined detection signals are routed to a multiplexer 140 by the combiners 160, 160' and, from said multiplexer, on to a distance determination apparatus 130.

Figure 8:
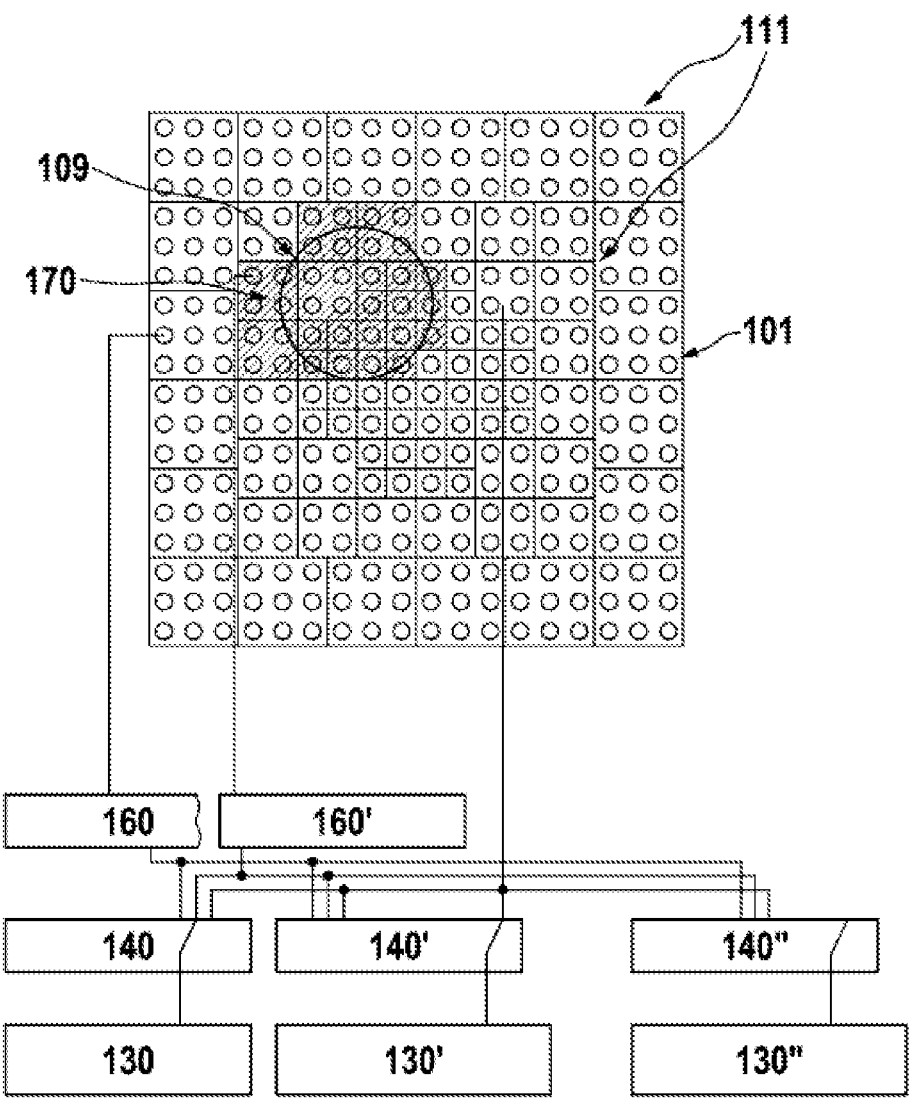
FIG. 8 shows a detection area of a reception apparatus with pixels in which the number of light-sensitive elements contained in the pixels varies depending on location and which are connected to several distance determination apparatuses via combiners and multiplexers.

FIG. 8 shows a special embodiment for a ranging device with corrected parallaxes using such elements for N=92 pixels 111. Here, 48 pixels merely have a single light-sensitive element, 24 pixels respectively have four light-sensitive elements in a 2×2 arrangement and 20 pixels respectively have 9 light-sensitive elements in a 3×3 arrangement. Each pixel 111 with more than one light-sensitive element 101 is connected to precisely one combiner 160, 160'. Accordingly, there are 44 combiners 160. The outputs of the pixels 111 with only one light-sensitive element or the outputs of the combiners 160 are connected to the inputs of K multiplexers 140. The outputs of the multiplexers 140 are in turn connected to M>=2 distance determination apparatuses 130. Here, neither M=K nor M=N necessarily applies. The connections for three pixels 111 of different size and with a different number of light-sensitive elements are illustrated in an exemplary manner. An area shaded in FIG. 11 reproduces an effective detector area 170, which comprises those pixels 111 which are in fact illuminated by laser light of the laser spot 109 and on the basis of which ranging to the target object can be carried out.

Figure 9:
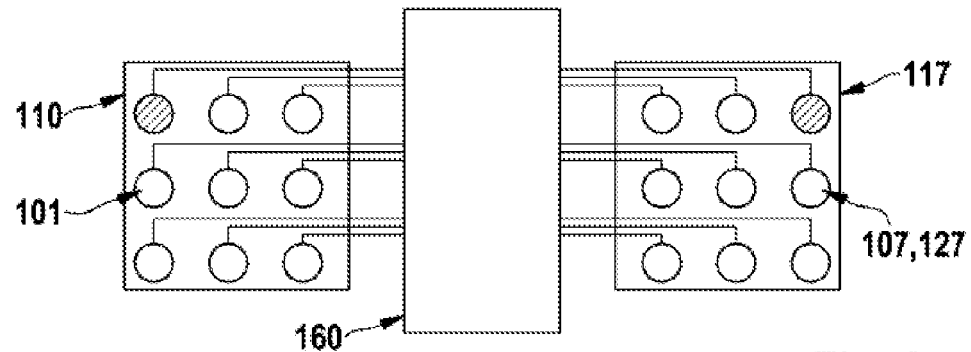
FIG. 9 shows a target detector array according to the disclosure with an identical reference detector array, consisting of 9 pixels with respectively one light-sensitive element in each case.

FIG. 9 schematically illustrates the interaction between reception unit and reference unit. As described above, the reception unit has a detection area 110 with a multiplicity of pixels 111. In the exemplary embodiment of FIG. 9, each pixel 111 has precisely one light-sensitive element 101. In this exemplary embodiment, the pixels 111 are arranged in the form of a 3×3 matrix (m×n=3×3), where the first value denotes the respective row and the second value identifies the associated column of the array or matrix. The pixel 1, 1 in the upper left-hand corner of the detection area (orientation this case as illustrated in FIG. 9) is utilized for ranging in this exemplary embodiment. The ranging value established by this pixel is associated with a reference measurement value for calibration purposes.

In the exemplary embodiment of FIG. 9, this is the light-sensitive element 1, 3 of a reference detector arrangement likewise embodied as a 3×3 matrix (l×k=3×3).

FIG. 9 therefore shows a system with a target detector array and an equivalent reference detector array. A corresponding reference detector (light-sensitive element) is selected for each target detector (light-sensitive element). In particular, that reference pixel is selected which corresponds in terms of its properties and the geometric arrangement in the array to the respective target measurement pixel. As a result of this, it is possible to compensate for the underlying problem of the run-time error or else the run-time drifts, wherein, in particular, it is also possible to take account of run-time errors within a detector arrangement.

In general, the following applies: the individual pixels or light-sensitive elements of a detector array can, depending on their position in the array, have different line lengths and hence different capacitances until the signals of the pixels leave the array and are able to be evaluated. External influences, such as e.g. temperature, or self-heating of a chip (IC) utilized for this during operation can vary the edge steepness of the components on the chip. Even small changes in the edge steepnesses, which typically lie in the range of several 10 ps/V, could thus cause distance errors in the mm-range.

The present disclosure solves this run-time problem between target detector and reference detector by virtue of the fact that a reference detector (light-sensitive element) with the same or at least a similar run-time drift is used for each target detector (light-sensitive element). The run-time error of the target detector to a reference detector is thereby reduced to a run-time drift difference between target detector and associated reference detector. Instead of a static run-time offset, which could for example be stored in a lookup table, the solution according to the disclosure also reduces run-time drifts (e.g. over temperature).

In particular, this is achieved by a symmetric design of the system, as shown in FIG. 9. In particular, a "symmetric design of the system" should in this case be understood to mean that the light-sensitive elements (101) of the detection area (110) of the reception apparatus form a reception array and the light-sensitive elements (107) of the detection area (117) of the reference apparatus form a reference array, wherein the respective array has a matrix-like design and both matrices are of the same order, i.e. both represent an m×n matrix.

This is the meaning of the statement that the reception array and the reference array have the same design.

Accordingly, the embodiment of FIG. 9 shows a system with a target detector array in the form of a 3×3 matrix of light-sensitive elements and an identical reference detector array in the form of a 3×3 matrix of light-sensitive elements. A corresponding reference detector is selected for each target detector (=light-sensitive element) in this case. Here, the detection area 110 of the reception unit 14 and the detection area 117 of the reference unit are advantageously implemented on a common chip. Here, the light-sensitive elements of the arrangement can advantageously be embodied as SPADs (single photon avalanche diodes) in particular.

A SPAD can have the property that, unlike conventional light-sensitive elements with analog operation, it does not supply a detection signal which is linearly dependent on the impinging radiation but rather generates an individual signal in the case of each impinging photon. After a photon impinges thereon, the SPAD cannot be activated again for a certain dead time, which can lie in the range of, for example, 1 to 100 ns. This is also referred to as a paralyzable response characteristic. The count rate with which a SPAD can count impinging photons therefore has an upper limit as a result of the dead time. It may therefore be advantageous to provide several smaller SPADs within one pixel instead of a single large-area SPAD and, for example, combine detection signals from SPADs contained in a single pixel with the aid of a combiner. By way of example, the combiner can in this case be embodied in the form of an OR gate or in the form of a bus. This allows the maximum photon count rate that can be achieved by the pixel to be increased or, expressed differently, the dead time of the pixel between individual detection events to be reduced. Furthermore, a pulse shortener can be arranged between a SPAD and a combiner or bus in order to shorten a digital signal generated by the SPAD in time and thereby enable a shortened overall dead time and an increased photon count rate of the system.

The number of SPADs or the area of SPADs contained in a pixel can be variably selected, depending on the location of the pixel within the detection area of the reception apparatus. By way of example, it may be known that the measurement radiation returning from the target object can impinge upon the detection area of the reception apparatus at a different position and/or with a different cross-sectional area, depending on the distance of the target object from the measuring device. The number of SPADs or the area of the SPADs within a pixel can accordingly be adapted to the expected impinging light intensity, depending upon position. By adapting the areas of the SPADs and/or the number of SPADs within a pixel, it is possible to optimize a dynamic range of the measuring device. By adapting the pixel areas to a laser spot size, it is possible to optimize a signal-to-noise ratio.

Figure 10:
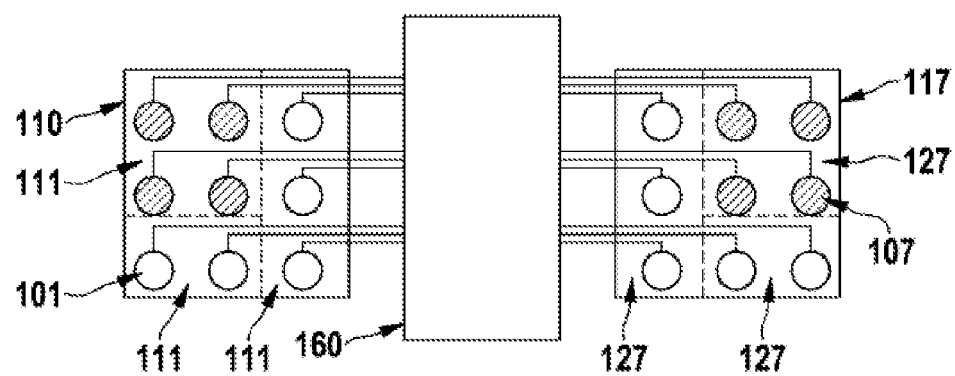
FIG. 10 shows an alternative target detector array according to the disclosure with an identical reference detector array, consisting of 3 pixels with respectively several light-sensitive elements in each case.

In the exemplary embodiment of FIG. 10, three pixels are formed in each case on the detection area 110 of the reception unit 14 and the detection area 117 of the reference unit. A first pixel comprises 4 light-sensitive elements in the form of a 2×2 matrix; moreover, there is also a pixel with three light-sensitive elements and a pixel with two light-sensitive elements. A 2×2 pixel arranged in an analogous fashion on the side of the reference unit corresponds to the 2×2 pixel, switched together, on the target measurement side. In this context, switched together means that a parallel measurement of several target detectors (light-sensitive elements) is undertaken, as explained above in detail when describing the reception unit. In the exemplary embodiment of FIG. 10, the corresponding pixels are also selected on the reference detector array in order to minimize corresponding drifts.

The use of two identical detector arrays with symmetrical design for reception unit and reference unit is the preferred solution in order to select a reference detector with "identical" properties for each target detector.

However, other arrangements are naturally also possible.

Figure 11:
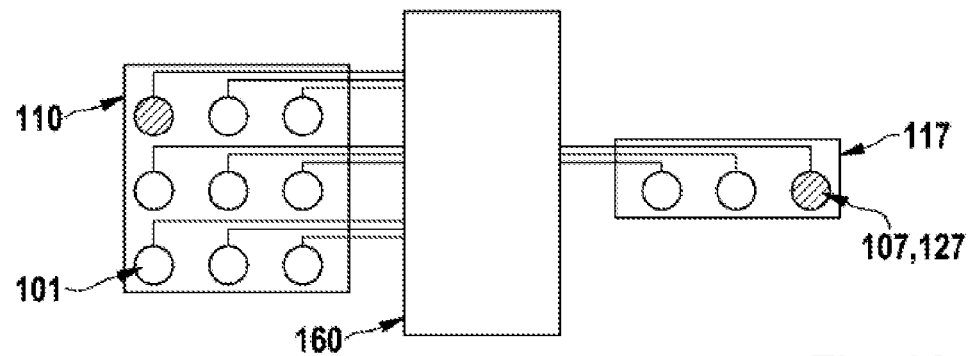
FIG. 11 shows a further target detector array according to the disclosure with a reference detector array different thereto, consisting of 9 and 3 pixels, respectively, each with one light-sensitive element.

By way of example, FIG. 11 shows an alternative embodiment according to the disclosure, with non-symmetrical arrays. On the side of the target detector (reception unit), there once again is a 3×3 matrix of 9 light-sensitive elements, as also described in conjunction with FIG. 9. However—in contrast to the exemplary embodiment in FIG. 9—a reduced reference-detector array with merely 3 light-sensitive elements in the form of a 1×3 matrix is used on the reference side. By way of example, in order to save chip area, merely a single reference-detector element (=light-sensitive element) is therefore is associated with each column of the target-detector side (reception unit) matrix. That is to say, only one row of the reference-detector array has an identical design to the target-detector array.

The disclosure is not restricted to the arrangements of light-sensitive elements on the reception or reference side as shown in the exemplary embodiments.

By way of example, it is alternatively also possible to reproduce the reference array using concentrated elements. By way of example, a reference detector could be switchably connected to resistive or capacitive elements in order thus to reproduce the line lengths and loads of the respective reference detectors.

Finally, aspects and advantages of embodiments of the disclosure should once again be summarized in other words:

An embodiment of the disclosure is based on the main idea of advantageously designing the type of the arrangement of individual light-sensitive elements in pixels, the signals of which are combined before they are fed for further evaluation to a time evaluation unit with a plurality of distance determination apparatuses. In this case, a pixel is formed by the number of light-sensitive elements whose signals are combined by means of a combiner. Here, the measuring device according to the disclosure comprises a reception apparatus with a detection area for detecting optical measurement radiation returning from a target object, wherein the detection area has a multiplicity of pixels, wherein each pixel has at least one light-sensitive element. Moreover, the measuring device according to the disclosure also comprises a reference apparatus with a detection area for detecting device-internal reference radiation, wherein the detection area of the reference apparatus also has a multiplicity of pixels, wherein each pixel has at least one light-sensitive element.

The individual pixels can be operated independently of one another. In particular, it is possible to carry out a phase evaluation of a continuous wave or, alternatively, a flight-time evaluation of a pulse for each individual pixel.

A combination of several light-sensitive elements to form pixels can be spatially designed in such a way that the signal-to-noise ratio can be optimized both at large and at small distances, particularly under strong background illumination, with few distance determination apparatuses. This can be achieved by an adaptation that is location-dependent over the detection area of the size of the pixels or the number of light-sensitive elements that are combined to form a pixel.

A detection area can be dimensioned to be so large that the demands on the adjustment of the reception optical unit can be reduced. Moreover, the influence of optical aberrations, in particular the aberrations due to defocusing as a result of the too small depth-of-field, can be minimized. As a result, the demands on the optical quality of the reception optical unit can be reduced.

It is possible to minimize run-time errors and, in particular, run-time drifts and to increase the measurement accuracy by the direct assignment of pixels from the reference unit to pixels of the reception unit.

A further advantage can lie in the optimization of the signal-to-noise ratio, particularly in the case of large measurement distances in the case of a high background light proportion. This can be achieved by virtue of the fact that, at all distances, the effective detection area can be adapted, i.e. minimized, in an optimum fashion to the size of the actually imaged laser measurement spot in the detection plane. After the completed measurement, the signals of only those individual light-sensitive elements or pixels with several light-sensitive elements which actually receive laser radiation can be evaluated in a targeted manner. As a result, it is possible to reduce the effective detection area and minimize the noise contribution of the background light, which can be equivalent to improving the signal-to-noise ratio.

A further advantage can consist of the fact that, as a result of combining several light-sensitive elements within a pixel, there is the need for fewer distance determination apparatuses than there are light-sensitive elements. This can reduce a required chip area of an integrated circuit. This advantage can play an important role, particularly in the case of laser ranging instruments which generally operate with a fixed focal length, since the laser spot diameter can then vary depending on the distance of the target object. FIG. 6 illustrates this for a system in which the parallax error is not corrected. In order to optimize the signal-to-noise ratio by minimizing the effective detection area, as described above, it is possible in the case of larger laser spot diameters, i.e. generally in the case of smaller distances of the target object, that accordingly only a lower resolution of the detector is required. These circumstances can be utilized by the spatially dependent combination of light-sensitive elements to form pixels.

Since the effective detection area, i.e. the area that is taken into account in the evaluation of the measurement, is generally smaller than the overall detection area, the number of required distance determination apparatuses can be further reduced by virtue of a multiplexer also being applied in addition to the combination of light-sensitive elements. With the aid of preliminary measurements, the pixels receiving the laser radiation can initially be identified in this case and said pixels can subsequently be distributed over the distance determination apparatuses for the actual measurement. If N is the overall number of pixels with one or more light-sensitive elements and M is the number of distance determination apparatuses available for the evaluation, then at most N/M preliminary measurements (rounded up) have to be carried out for identification purposes. The measurement object can therefore be carried out using few measurements, ideally using a single measurement.

A further advantage can lie in the fact that individual pixels can be calibrated independently of one another, for example in respect of a phase offset.

The invention claimed is:

1. A hand-held measuring instrument for ranging, comprising:
   a transmission apparatus configured to emit optical measurement radiation toward a target object;
   a reception apparatus including a first detection area configured to detect optical measurement radiation returning from the target object, the first detection area having a first plurality of pixels, each pixel of the first plurality of pixels having at least one light-sensitive element; and
   a reference apparatus including a second detection area configured to detect device-internal reference radiation, the second detection area having a second plurality of pixels, each pixel of the second plurality of pixels having at least one light-sensitive element, each pixel of the first detection area being associated with a pixel of the second detection area of the reception apparatus, the second detection area being formed separately from the first detection area.

2. The measuring instrument as claimed in claim 1, wherein:
   each pixel of the first detection area generates target measurement and each pixel of the second detection area generates reference measurement; and
   the generated target measurement of each pixel of the first detection area is calibrated using the generated reference measurement of the associated pixel of the second detection area.

3. The measuring instrument as claimed in claim 1, wherein a pixel of the first plurality of pixels of the first detection area of the reception apparatus has the same number of light-sensitive elements as a pixel of the second plurality of pixels of the second detection area of the reference apparatus.

4. The measuring instrument as claimed in claim 3, wherein each light-sensitive element of the second detection area of the reference apparatus is associated with one light-sensitive element of the first detection area of the reception apparatus.

5. The measuring instrument as claimed in claim 3, wherein:
   the light-sensitive elements of the first detection area of the reception apparatus form a reception array, and
   the light-sensitive elements of the second detection area of the reference apparatus form a reference array.

6. The measuring instrument as claimed in claim 5, wherein:
   the reception array is formed as an n×m matrix,
   the reference array is formed as an l×k matrix, and
   n, m, l, k are integers.

7. The measuring instrument as claimed in claim 5, wherein the reception array and the reference array have the same configuration.

8. The measuring instrument as claimed in claim 1, wherein the first detection area of the reception unit and the second detection area of the reference unit are implemented on a common chip.

9. The measuring instrument as claimed in claim 1, further comprising:
   an evaluation apparatus including a plurality of distance determination apparatuses.

10. The measuring instrument as claimed in claim 9, wherein the evaluation apparatus is configured in such a way that at least one distance determination apparatus of the plurality of distance determination apparatuses is supplied with detection signals from a plurality of pixels, on the basis of which the respective distance determination apparatus establishes distance data.

11. The measuring instrument as claimed in claim 9, wherein the distance determination apparatuses of the plurality of distance determination apparatuses are respectively configured (i) to establish a time-of-flight of measurement radiation from an emission from the transmission apparatus to a detection of measurement radiation returning from the target object, and (ii) to determine a distance therefrom.

12. The measuring instrument as claimed in claim 11, wherein the distance determination apparatuses of the plurality of distance determination apparatuses are respectively configured (i) to establish a time-of-flight of reference radiation from an emission from the transmission apparatus to detection by the reference apparatus, and (ii) to determine a reference distance therefrom.

13. The measuring instrument as claimed in claim 12, wherein the evaluation apparatus is configured to determine a distance between the measuring device and the target object on the basis of the distances determined by the distance determination apparatuses.

14. The measuring instrument as claimed in claim 1, wherein:
  the transmission apparatus and the reception apparatus are arranged next to one another along a parallax axis, and
  the number of light-sensitive elements contained in a pixel of the first plurality of pixels varies depending on a position of the pixel along the parallax axis.

15. The measuring instrument as claimed in claim 1, wherein the reception apparatus and the evaluation apparatus are configured to allow detection signals from individual pixels of the first plurality of pixels to be evaluated by the evaluation apparatus, independently of detection signals from other pixels of the first plurality of pixels.

16. The measuring instrument as claimed in claim 1, wherein at least one of the light-sensitive elements of the detection area of the reception apparatus, and the light-sensitive elements of the detection area of the reference apparatus are formed by SPADs.

17. A hand-held measuring instrument for ranging, comprising:
  a transmission apparatus configured to emit optical measurement radiation toward a target object;
  a reception apparatus including a first detection area configured to detect optical measurement radiation returning from the target object, the first detection area having a first plurality of pixels, each pixel of the first plurality of pixels having at least one light-sensitive element; and
  a reference apparatus including a second detection area configured to detect device-internal reference radiation, the second detection area having a second plurality of pixels, each pixel of the second plurality of pixels having at least one light-sensitive element,
wherein the transmission apparatus and the reception apparatus are arranged next to one another along a parallax axis, and
wherein the number of light-sensitive elements contained in a pixel of the first plurality of pixels varies depending on a position of the pixel along the parallax axis.

* * * * *